(12) United States Patent
Liberman et al.

(10) Patent No.: US 10,389,687 B2
(45) Date of Patent: Aug. 20, 2019

(54) SECURE DOCUMENT TRANSMISSION

(71) Applicant: SOREQ NUCLEAR RESEARCH CENTER, Yavne (IL)

(72) Inventors: Zvi Liberman, Kfar Mordehai (IL); Bruno Sfez, Jerusalem (IL); Abraham Englander, Rehovot (IL); Ohad Meshulam, Tel Aviv (IL); Avraham Hermon, Har Bracha (IL)

(73) Assignee: SOREQ NUCLEAR RESEARCH CENTER, Yavne (IL)

( * ) Notice: Subject to any disclaimer, the term of this patent is extended or adjusted under 35 U.S.C. 154(b) by 0 days.

(21) Appl. No.: 15/556,618

(22) PCT Filed: Mar. 8, 2016

(86) PCT No.: PCT/IB2016/051303
§ 371 (c)(1),
(2) Date: Sep. 8, 2017

(87) PCT Pub. No.: WO2016/142856
PCT Pub. Date: Sep. 15, 2016

(65) Prior Publication Data
US 2018/0262470 A1    Sep. 13, 2018

Related U.S. Application Data

(60) Provisional application No. 62/129,856, filed on Mar. 8, 2015.

(51) Int. Cl.
*G06F 21/56* (2013.01)
*H04L 29/06* (2006.01)
(Continued)

(52) U.S. Cl.
CPC ...... *H04L 63/0428* (2013.01); *G06F 17/2205* (2013.01); *G06F 21/42* (2013.01);
(Continued)

(58) Field of Classification Search
CPC ... H04L 63/1441; G06F 21/42; G06F 21/6209
See application file for complete search history.

(56) References Cited

U.S. PATENT DOCUMENTS

2003/0229810 A1    12/2003  Bango
2004/0024898 A1*   2/2004   Wan .................. G06F 17/30056
                                              709/231
(Continued)

OTHER PUBLICATIONS

International Search Report and Written Opinion dated Jul. 5, 2016 for corresponding PCT Application No. PCT/IB2016/051303 filed Mar. 8, 2016.
(Continued)

*Primary Examiner* — Ellen Tran
(74) *Attorney, Agent, or Firm* — A. C Entis-IP Ltd.; Kenichi N. Hartman; Allan C. Entis

(57) ABSTRACT

Embodiments of the invention relate to a method and a system for safely transmitting a document from a first network to a second network, while obviating the risk of transferring malware contained within the document to the second network. Embodiments of the invention involve separating binary data elements from text based data elements in a document, preferably a document in digital form. The binary data is then converted into analog media using an analog convertor, and then received by an analog receiver associated with the second network. Text-based data elements may remain in digital form, be cleaned of scripts, and are transferred to the second network in digital form. The document may be reconstructed using a computing device of the second network by combining data received via the analog receiver and the digital data comprising text-based data.

19 Claims, 4 Drawing Sheets

(51) Int. Cl.
    *G06F 21/42*     (2013.01)
    *G06F 21/60*     (2013.01)
    *G06F 21/62*     (2013.01)
    *G06F 17/22*     (2006.01)

(52) U.S. Cl.
    CPC ............ *G06F 21/56* (2013.01); *G06F 21/606* (2013.01); *G06F 21/6209* (2013.01); *H04L 63/1441* (2013.01); *H04L 63/20* (2013.01)

(56) References Cited

U.S. PATENT DOCUMENTS

| | | | | |
|---|---|---|---|---|
| 2008/0228928 | A1* | 9/2008 | Donelli | G06F 17/30029 |
| | | | | 709/228 |
| 2008/0281983 | A1* | 11/2008 | Cooley | H04L 63/145 |
| | | | | 709/245 |
| 2012/0159606 | A1 | 6/2012 | Sobolewski et al. | |
| 2014/0075535 | A1 | 3/2014 | Soffer et al. | |

OTHER PUBLICATIONS

European Supplementary Search Report dated Oct. 17, 2018 for Application No. 16761177.1 filed Sep. 13, 2017.

\* cited by examiner

SECURE DOCUMENT TRANSMISSION

RELATED APPLICATIONS

The present application is a U.S. National Phase of PCT Application No. PCT/IB2016/051303, filed on Mar. 8, 2016, which claims the benefit under 35 U.S.C. 119(e) of U.S. Provisional Application 62/129,856 filed Mar. 8, 2015, the disclosures of which are incorporated herein by reference.

TECHNICAL FIELD

Embodiments of the invention relate to secure document transmission and network security.

BACKGROUND

Malicious software, otherwise known as "malware," is software that is installed on a user's computing device, usually without the intention of the user of the computing device. Malware may cause harm to the computing device or the data stored on the computing device thereby negatively impacting the user or owner of the computing device. In particular, malware may, against the user's will or without the user's knowledge, relay confidential data from a user's computing device to another computing device, disrupt the regular functioning of the computing device, remotely send email from a user's email account or report computing device user trends to an external computing device.

Malware is frequently disguised as and/or embedded in non-malicious files. Many types of malware exist, including but not limited to Trojan horses, viruses, worms, adware, rootkits and spyware. A Trojan horse, one of the most common types of malware, is a program that asks a user to run it while being disguised as a non-harmful, useful program. After execution of the Trojan horse, it may begin to cause harm to a user's computing device.

Malware is transferred to computing devices via a variety of methods. One of the most common methods of proliferation of malware is through the internet, through email and through the World Wide Web (WWW).

Businesses and corporations frequently take precautions to prevent malware attack against their computer networks. In addition, governmental agencies often face threats of potential domestic or foreign computer-related attacks and as a result, take precautions to prevent malware attacks against their computer networks.

In order to defend against malware, a variety of methods are used. Examples of those methods include antivirus software, website scanning software and firewalls. These methods have disadvantages and can be infected by certain types of malware.

Some institutions may user an "air gap" as a strategy to prevent the institution's network from becoming contaminated with malware. An air gap is a policy in which a network is completely isolated from computing devices in other networks, as no communication is allowed between the institution's network and other networks. A significant disadvantage of such a policy is the inability of users of the institution's network to access other networks such as the internet.

SUMMARY

Embodiments of the invention provide a method and a system for safely transmitting a document from a first network to a second network, while obviating the risk of transferring malware contained within the document to the second network.

As malware is frequently hidden within binary data, embodiments of the invention involve separating binary data elements from text based data elements in a document, preferably a document in digital form. Binary data, as opposed to text based data, refers to data that is not interpreted as text. Binary data may be data of a picture, image or graphic.

After separating the binary data elements from the text-based data elements in a document stored in the first network, the binary data is converted into analog media using an analog convertor, and received by an analog receiver associated with the second network. The conversion obviates risk associated with transferring binary data in a digital form that potentially contains malware. Text-based data elements may remain in digital form, optionally be cleaned of scripts, and transferred to the second network in digital form. The document may be reconstructed using a computing device of the second network by combining data received via the analog receiver and the digital data comprising text-based data.

According to embodiments of the invention, the first network is a network with connection to the WWW and the second network is a private network that does not have access to the WWW. By employing methods according to embodiments of the invention, the second network can safely and accurately access information available on the WWW using embodiments of the invention, without the risk of exposure to web-based malware.

Methods according to embodiments of the invention are advantageous relative to current anti-malware techniques. Since many current, known anti-malware methods, including antivirus software, website scanning and firewalls, rely on databases comprising information on previously identified malware. New types of malware or malware specifically engineered towards a specific target may not be detected by these known techniques. Embodiments of the invention may obviate the need for malware databases and allow for users to transfer documents to secure networks without risking malware infection. Methods according to embodiments of the invention allow for rapid electronic transfer of documents from one network to another while maintaining functionality, for example, editability of text, of the document.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF FIGURES

Non-limiting examples of embodiments are described below with reference to figures attached hereto that are listed following this paragraph. Identical structures, elements or parts that appear in more than one figure are generally labeled with a same numeral in all the figures in which they appear, and a numeral labeling an icon representing a given feature in a figure may be used to reference the given feature. Dimensions of components and features shown in the figures are chosen for convenience and clarity of presentation and are not necessarily shown to scale.

DETAILED DESCRIPTION

Figure 1A:
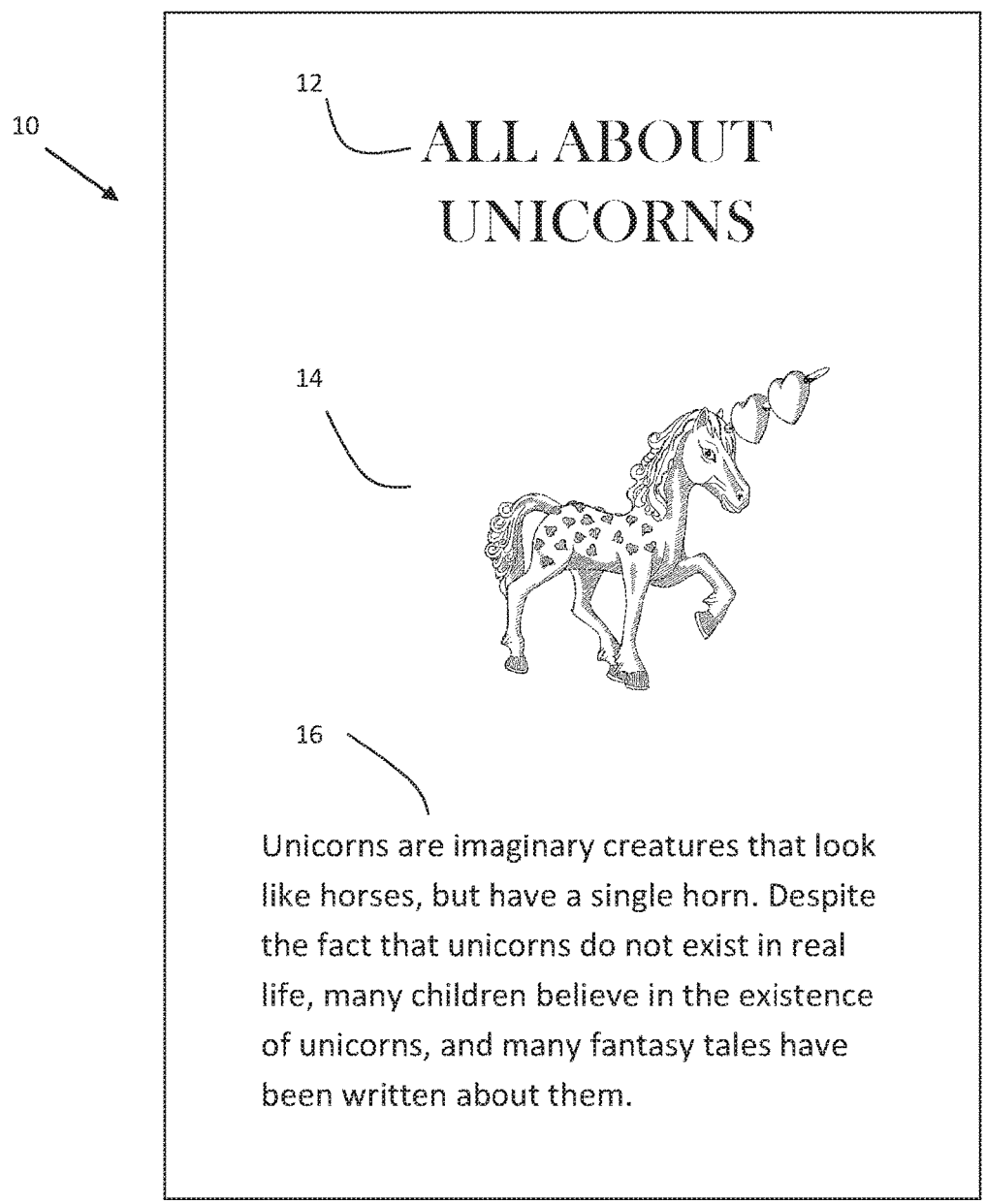
FIG. 1A depicts a document that can be transferred to a secure network according to an embodiment of the invention.

Reference is now made to FIG. 1A that depicts an exemplary displayed document 10 which can be transferred to a secure network, according to embodiments of the invention.

Document 10 comprises a number of types of fields within one document. Document 10 may comprise textual fields in addition to image fields. Document 10 comprises title text 12, image 14 and text 16.

Document 10, according to an embodiment of the invention, may be in the format of an editable document, such as a word processor document. According to an embodiment of the invention document 10 is a Microsoft Word, Excel or Powerpoint document. According to an embodiment of the invention, the document is a web document or a hypertext markup language (HTML) document.

Image 14 may be an image that is encoded as binary data. Image 14 may be embedded in document 10. Image 14 may be in any format, such as but not limited to jpg, jpeg, bmp, png, or gif file. A document 10 may comprise multiple images 14.

According to an embodiment of the invention, as an alternative or in addition to images, documents may contain other data encoded as binary data. By way of example, a document may comprise embedded audio or video data encoded as binary data. Exemplary documents which may comprise embedded audio and/or video include Microsoft Powerpoint documents.

According to an embodiment of the invention, image 14 comprises a picture, drawing and/or a graphic. According to an embodiment of the invention, image 14 comprises a watermark, icon and/or logo.

According to an embodiment of the invention, features, such as size and font, of various portions of text within a document may differ from each other. As shown in document 10, title text 12 differs in font and size from text 16.

Document 10 can be classified by administrators of a network, according to an embodiment of the invention, as a security threat and as a file with potential malware. Document 10 may comprise malware code within the data that codes for image 14. Although when document 10 is viewed by a viewer using a computing device on which document 10 is stored, image 14 may appear to be a harmless image of a unicorn, but the malware code may be disguised so as to be not visible to the eye.

Figure 1B:
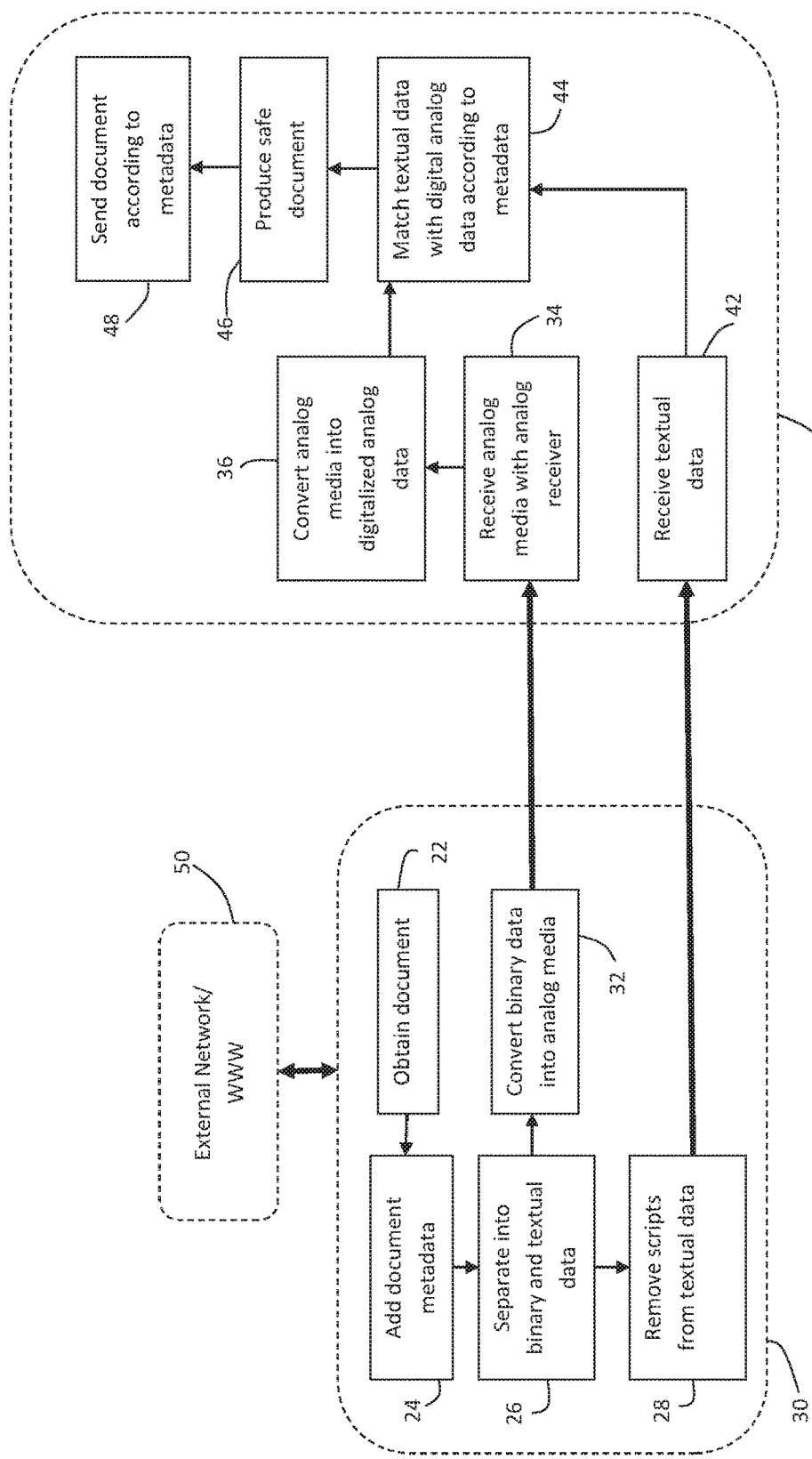
FIG. 1B depicts a flow diagram showing method for transmitting documents while avoiding transferring malware associated with the document, according to an embodiment of the invention.

Reference is now made to FIG. 1B that depicts a method 20 for securely transmitting documents according to embodiments of the invention. Method 20 comprises a first network 30, a second network 40 and an external network 50.

According to an embodiment of the invention, first network 30 comprises a computing device or multiple computing devices. Optionally, a computer device may be a smartphone, a desktop computer, a laptop computer, a phablet, a tablet, a smartwatch or a server. Optionally, a computer device may be a "distributed system" with code and hardware components located in different locations. First network 30 may be configured to have a wired or wireless connection to another network, for example, external network 50. External network 50 may be internet or WWW.

First network 30 may employ a firewall, website security software and/or antivirus software to prevent infection by malware.

According to an embodiment of the invention, second network 40 comprises a computing device or multiple computing devices. Second network 40 may comprise an air gap policy (with the exception of limited access to first network 30) to prevent infection by malware.

Method 20 comprises a method to transfer a document from first network 30 to second network 40 without risking infection of second network 40 by malware. Documents comprising text and binary data, such as document 10, present in first network 30 are presumed to contain malware as a result of connection of first network 30 to external network 50. As a result, documents are processed using method 20 to lower risk for malware infection of second network 40.

Method 20 comprises block 22 that comprises obtaining a document. Obtaining a document is discussed in further detail below, in reference to FIG. 1C. The document may be stored on a computing device associated with first network 30. The document may be document 10 (shown in FIG. 1A). The document may comprise binary data elements and text-based data elements. The document is preferably in digital form. The document may be a document obtained from external network 50.

Method 20 further comprises block 24 that comprises adding metadata to the document. Metadata of block 24 may comprise details regarding the document, such as file name or date of receipt of the document. Metadata of block 24 may comprise information regarding binary data elements of the document such as data type (image, audio etc.), size of binary data elements and/or location of data elements within the document. By way of example, if the document is document 10 (shown in FIG. 1A), metadata may comprise indication that FIG. 14 is located in the center of the document, and/or indication of distance between FIG. 14 and text 12, and distance between FIG. 14 and text 16. Metadata of block 24 may comprise the origin of the document, the sender of the document, and/or the intended recipient of the document. Metadata according to block 24 may be stored on a memory associated with a computing device of first network 30.

Method 20 further comprises block 26 that comprises separating the document into binary data and textual data. According to an embodiment of the invention, textual data is separated from the remainder of the document. The textual data may be isolated from the document and stored in a file comprising primarily textual data. The textual data and/or textual data file may be associated with document metadata that was associated with the document in block 24.

The textual data separated from the document according to block 26 may be stored in a textual data format for example, American Standard Code for Information Interchange (ASCII), a text (txt) file, an Extensible Markup Language (XML) file or an Extensible Hypertext Markup Language (XHTML) file. This separation preferably occurs using a computing device of first network 30.

By way of example, if the document is document 10 (shown in FIG. 1A), textual data of title text 12 and text 16 may be separated into an xml document and image 14 may be separated for further processing according to block 32.

Method 20 further comprises block 28 that comprises analyzing textual data, and removing scripts from the textual data, if applicable. As scripts may potentially be malware-related scripts, textual data is scanned for scripts, and the scripts are determined to be either safe scripts, or malware-scripts. If a script is found which is suspected of being malware, it is removed from the textual data. According to an embodiment of the invention, the textual data is scanned for macros. This analysis is preferably performed by a computing device of first network 30.

Method 20 further comprises block 32 that comprises converting binary data into analog media. Analog media may be a form of data that is displayed in an analog form so that the code which encoded it is not detectable by a viewer of the displayed media. This conversion is preferably performed by a computing device of first network 30. According to an embodiment of the invention, the binary data encodes an image, and the image is converted into analog media in the form of a displayed image by displaying the image on a screen or printing the image on paper. According to an embodiment of the invention the binary data encodes analog media in the form of audio or video and the audio or video are transmitted via an analog device such as a speaker or a screen respectively.

For example, in the case of document 10, a computing device of first network 30 may display image 14 on a screen, thereby converting binary data representing image 14 into analog media displaying image 14.

Method 20 further comprises block 34 that comprises receiving analog media with an analog receiver. Preferably, the analog receiver is connected directly to a computing device of second network 40. If the analog media is in the form of a displayed image, the analog receiver may be an optical recording device, such as a camera or a scanner. If the analog media is in the form of audio, the receiver may comprise a microphone. For example, in the case of document 10, a camera may be used as an analog receiver to capture image 14 as displayed according to box 32 as analog media, on a screen.

Receiving of analog media in analog form by second network obviates the risk associated with digital transfer of binary data from one network to another. Even when analog media is converted to digitalized analog media, the malware functionality potentially associated with the digital binary data is lost.

Without being bound by theory, according to embodiments of the invention, textual elements remain in digital form and are not converted to analog form, for any of the following reasons: a. textual data carries a lower risk of transferring malware; b. scripts are easily removed from textual data; c. conversion of textual data to analog form may be associated with loss of accuracy of data, increased memory capacity associated with transfer of the data, and increased time of transfer of the data and/or reconversion of the data from analog to digital form.

Method 20 further comprises block 36 that comprises converting analog media received according to block 34, to a digitalized form. The digitalized analog data is preferably stored on a computing device of second network 40. The digitalized analog data may be converted into the same digital format or file type as before conversion of binary data into analog media. The digitalized analog data may be associated with document metadata that was associated with the document in block 24.

For example, in the case of document 10, the camera may convert the photographed image 14 into digitalized analog data by saving it as a digital image file, such as a "jpg" type file.

Method 20 further comprises box 42 that comprises receiving textual data in the second network. Textual data of document, after script removal (according to box 28) may be sent from a computing device of first network 30 to a computing device of second network 40. Textual data may be accompanied by documents metadata (according to box 24) when sent to a computing device of second network 40. Preferably, according to box 42, textual data is received via a digital channel. The digital data can be also transmitted, for example, through a one-way directional transmission system such as a QR code displayed on a screen that is read by a camera that captures the QR code and transforms it back to digital data, a modulated laser beam and a detector that detects the modulated signal and transforms it back to digital data.

Method 20 further comprises box 44 which comprises matching textual data with digitalized analog data. Matching textual data with digitalized analog data may be performed using metadata received by the second network.

Method 20 further comprises box 46 which comprises producing a safe document. The safe document can be reconstructed by combining the digitalized analog data that replaces the binary data elements of the original document, together with the textual data that replaces of the text-based elements of the original document. Metadata associated with the document may comprise details regarding binary data elements and text-based elements of the original document, and the safe document may be reconstructed using the metadata.

Method 20 further comprises box 48 which comprises sending a document to a recipient according to metadata. Metadata may comprise an intended address, name or other detail of a document recipient. The document may be sent to the recipient, for example, via internal e-mail using the metadata received.

Methods according to embodiments of the invention provide efficient, safe ways to transfer documents between networks without risking security of the receiving network, even when the sending network is potentially exposed to malware. According to an embodiment of the invention, the document received at the second network is the same (in terms of content and readability) as the document sent from the first network and is of high quality, similar to the document sent from the first network.

Figure 1C:
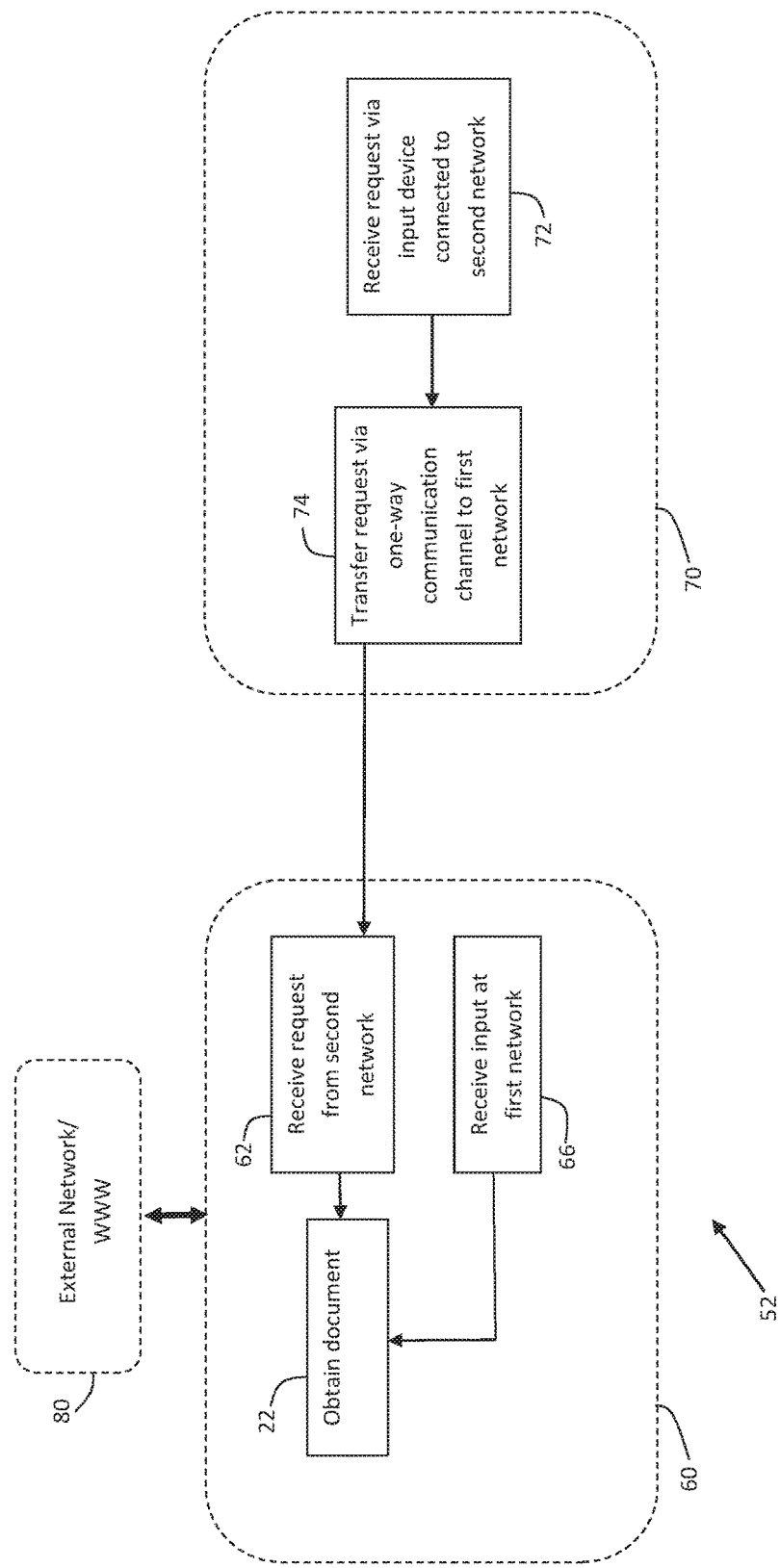
FIG. 1C depicts a flow diagram showing a method for obtaining document.

Reference is now made to FIG. 1C, which depicts a flow diagram showing a method 52 for obtaining a document. Method 52 comprises a first network 60, a second network 70 and an external network 80. External network 80 may be the World Wide Web. Method 52 comprises methods to obtain a document at a first network 60.

Method 52 optionally comprises a method to obtain a document at a first network 60 based on input received at first network according to block 66. Input may be received through an input device, for example a keyboard, which is directly linked to a computer of first network 60. For example, a keyboard may be connected to a computer of first network 60. A user may enter a web address such as a Uniform Resource Locator (URL) into the keyboard, or click on a link, using a mouse on an icon or hyperlink associated with a URL. The computer of first network 60 may then obtain a document as in block 22. The document may be obtained through a connection of first network 60 to an external network, such as block 80.

Method 52 optionally comprises a method to obtain a document at a first network 60 based on input received at second network 70, according to block 72. Input may be received through an input device, for example a keyboard, which is directly linked to a computer of second network 70. A signal representing the request of block 72 may be transferred, as in block 74, via a one-way communication channel to first network 60. The one way communication channel may be a simplex communication channel. The one way communication channel does not allow communication from first network 60 to second network 70, thereby ensuring the safety of second network 70. According to block 62, a signal representing the request of block 72 is received at first network 60, optionally, via a communication device linked to a computer of first network 60. The computer of first network 60 may then obtain a document as in block 22. The document may be obtained through a connection of first network 60 to an external network, such as block 80. For example, a user may input, according block 70 a URL to an input device connected to second network 70. The URL may be transferred, according to block 74, via a one-way communication channel to a computer of first network 60, and received according to block 62. The first network may then access the internet as in block 80 according to the received URL, thereby obtaining the document (webpage) associated with the URL as in block 22.

Using the aforementioned method allows a user to access a single computer at a second network, input a request for a document at the computer of the second network, and receive from an external network, via the first network, a safe document, obviating risks associated with retrieving documents from an external network.

Figure 2:
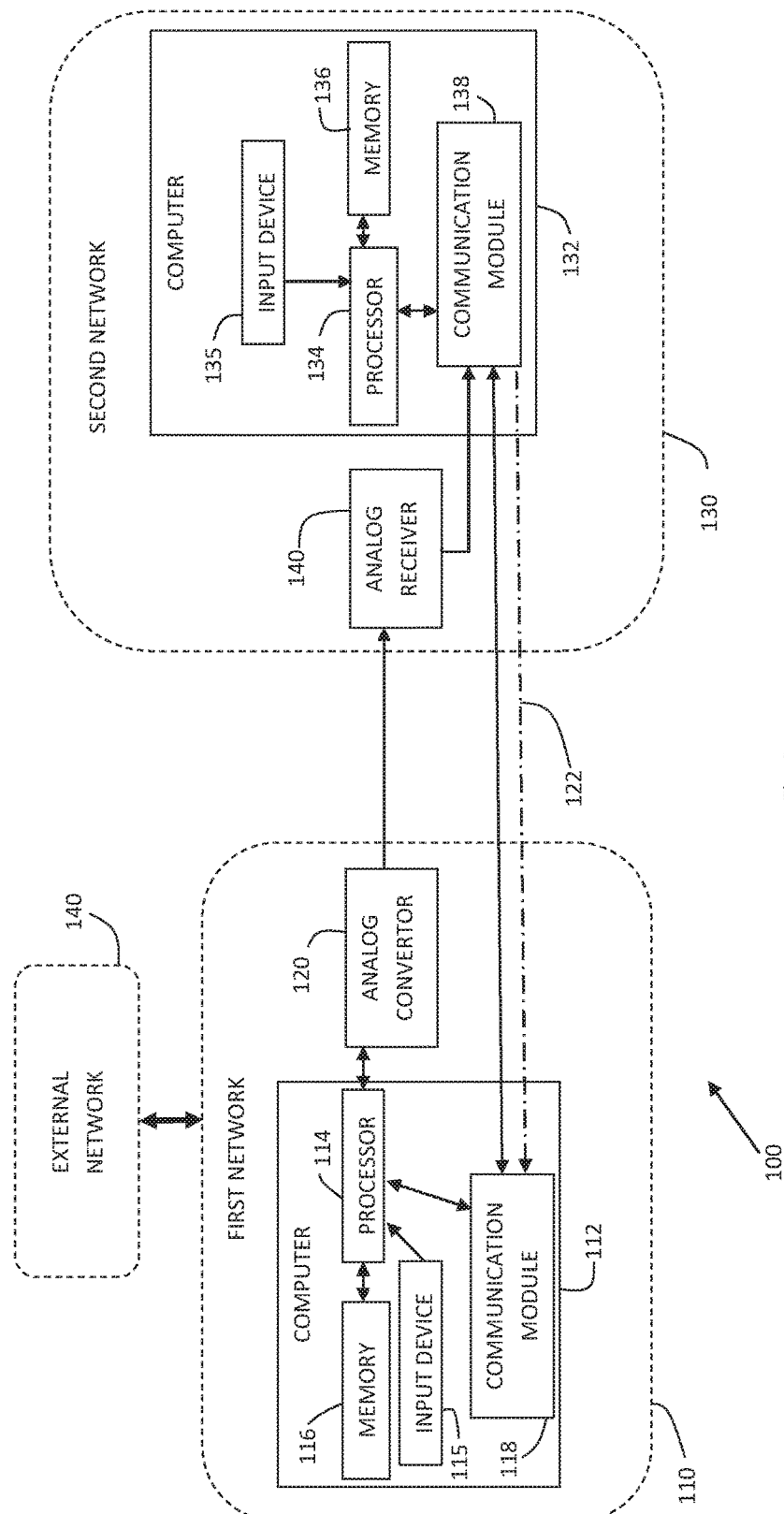
FIG. 2 depicts a box diagram showing a system for safely transmitting documents from one network to another network, according to embodiments of the invention.

Reference is now made to FIG. 2 which comprises a system 100 according to embodiments of the invention. System 100 comprises a first network 110 and a second network 130. System 100 further comprises an external network 140.

First network 110 comprises a computer 112 and an analog convertor 120. Computer 112 may comprise a processor 114, an input device 115, a memory 116 and a communication module 118. Second network 130 comprises a computer 132 and an analog receiver 140. Computer 132 may comprise a processor 134, an input device 135, a memory 136 and a communication module 138.

System 100 may comprise a one-way communication channel 122, allowing one-way transmission of a signal from second network 130 to first network 110. The one-way communication channel 122 may be a simplex communication channel.

According to an embodiment of the invention, second network 130 is a network with an air-gap policy in place, with the exception of restricted connections to first network.

According to an embodiment of the invention, first network 110 is a network with access to external network 140. According to an embodiment of the invention, external network 140 is the Internet/WWW.

During the operation of system 100, a document may be securely transmitted between first network 110 and second network 130 without the potential of transmitting malware with the document. According to an embodiment of the invention, the transferred document comprises textual data elements and binary data elements. The document may be stored, for example as a machine readable document, in memory 116 of computer 112. Processor 114 comprises machine readable code enabling it to process the document by separating it into binary elements and textual elements. Processor 114 removes scripts from the textual elements. Processor 114 transmits, binary elements as a digital file to analog convertor 120.

Analog convertor 120 displays the binary elements as analog media. According to an embodiment of the invention, Analog convertor is a computer screen and the binary element is converted to analog media by displaying on the computer screen.

With regards to the textual elements of the document, processor 114 transmits textual elements, optionally in the form of ASCII, via communication module 118 to communication module 138 of computer 132 of second network 130.

Processor 114 may comprise machine readable code enabling the processor to attribute metadata to the document, to binary elements and to textual elements.

Analog receiver 140 of second network 130 receives analog media from analog convertor 120, and converts the analog media into digital form, transferring it to communication module 138 of computer 132. Processor 134 may comprise machine readable code enabling the processor to match and combine digitalized analog media received from analog receiver 140 with textual elements received from computer 112 of first network 110 to form a reconstructed, secure document. Processor 134 may then store the secure document on memory 136.

Instruction relating to document retrieval from an external network 140 may be received via input device 135. Computer 132 may transmit a signal indicate a request to retrieve a document through communication module 138, via one-way communication channel 122, to communication module 118 of computer 112. Processor 114 may comprise machine readable code enabling the processor to access external network 140 in accordance with the received signal indicating a request to retrieve a document.

Alternatively, instruction relating to document retrieval from an external network 140 may be received via input device 115 of computer 112.

FIG. 2 depicts a system comprising two networks comprising computing devices in each network. However, in order to perform methods according to embodiments of the invention for obtaining secure documents, two physically separated computing devices are not required. Embodiments of the invention relate to systems comprising a single computing device connected to an analog convertor and an analog receiver. The processor of the single computing device can allocate resources to serve as a computing device of a first network and resources to serve as a computing device of a second network. Secure documents may be obtained without the need of multiple computing devices.

Embodiments of the invention relate to a method for securely, electronically transmitting a document comprising text-based data elements and binary data elements from a first network to a second network, the method comprising: separating the text-based data elements from the binary data elements; sending the text-based data elements from the first network to the second network; converting the binary data elements to analog media using a computing device of the first network; converting the analog media to digitalized analog media using a computing device of the second network; and combining the digitalized analog media with the text-based data elements using a computing device of the second network to form a secure document. Optionally, the analog media is captured by an analog receiver which transmits it to a computing device of the second network. Optionally, the binary data elements encode an image, and the analog media is a display of the image. Optionally, the image is captured by an optical recording device. Optionally, the method further comprising scanning the text-based elements for scripts and removing a script before sending the text-based data elements to the second network. Optionally, the text-based data is in the form of ASCII data. Optionally, the second network is a secure network in which an air gap policy is implemented, with the exception of limited communication with the first network. Optionally, there is a policy of no transmission between the second network and the WWW. Optionally, there is transmission between the first network and the WWW. Optionally, the document is in HTML format or word processor document format.

Embodiments of the invention relate to a system configured to transfer documents in a secured fashion between a first network and a second network, the system comprising: a first network comprising a computing device comprising machine readable code, the computing device operable to separate binary data elements from text based data elements in a document and send text based data elements; a second network comprising a computing device comprising machine readable code, the computing device operable to receive text based data elements from a computing device of the first network; an analog convertor, configured to convert binary data elements received from a computing device of a first network to analog media; and an analog receiver, configured to receive analog media from the analog convertor, transform the analog media to digitalized form and transmit the digitalized analog media to a computing device of the second network; wherein, a computing device of the second network is configured to combine digitalized analog media received via the analog receiver with text based elements received from the computing device of the first network to form a secure document. Optionally, the analog receiver is a camera or a microphone. Optionally, the computing device of the first network comprises machine readable code configured to remove a script from a text based data element. Optionally, the second network is isolated from all other networks other than the first network.

In the description and claims of the present application, each of the verbs, "comprise," "include" and "have," and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method for securely, electronically transmitting a document comprising textual data elements and non-textual data elements from a first network to a second network, the method comprising:
    separating the textual data elements from the non-textual data elements;
    sending the textual data elements from the first network to the second network;
    converting the non-textual data elements to analog media using a computing device of the first network;
    sending the analog media to the second network;
    converting the analog media to digitalized analog media using a computing device of the second network; and
    combining the digitalized analog media with the textual data elements using a computing device of the second network to form a secure document.

2. The method according to claim 1 wherein the analog media is captured by an analog receiver which transmits it to a computing device of the second network.

3. The method according to claim 1 wherein the non-textual data elements encode an image, and the analog media is a display of the image.

4. The method according to claim 3 wherein the image is captured by an optical recording device.

5. The method according to claim 1 further comprising scanning the textual data elements for scripts and removing a script before sending the textual data elements to the second network.

6. The method according to claim 1 wherein the textual data elements are in the form of ASCII data.

7. The method according to claim 1 wherein the second network is a secure network in which an air gap policy is implemented, with the exception of limited communication with the first network.

8. The method according to claim 1 wherein there is a policy of no transmission between the second network and the WWW.

9. The method according to claim 8 wherein there is transmission between the first network and the WWW.

10. The method according to claim 1 wherein the document is in HTML format or word processor document format.

11. A system configured to transfer documents in a secured fashion between a first network and a second network, the system comprising:
    a first network comprising a computing device comprising machine readable code, the computing device operable to separate non-textual data elements from textual data elements in a document and send textual data elements;
    a second network comprising a computing device comprising machine readable code, the computing device operable to receive textual data elements from a computing device of the first network;
    an analog convertor, configured to convert non-textual data elements received from a computing device of a first network to analog media; and
    an analog receiver, configured to receive analog media from the analog convertor, transform the analog media to digitalized form and transmit the digitalized analog media to a computing device of the second network;
    wherein, a computing device of the second network is configured to combine digitalized analog media received via the analog receiver with textual data elements received from the computing device of the first network to form a secure document.

12. The system according to claim 11 wherein the analog receiver is a camera or a microphone.

13. The system according to claim 11 wherein the computing device of the first network comprises machine readable code configured to remove a script from a textual data element.

14. The system according to claim 11 wherein the second network is isolated from all other networks other than the first network.

15. The method according to claim 1, further comprising:
receiving an input at a computing device of the second network, the input indicative of a request for a document;
transferring a signal representing the request for a document, via a one-way communication channel from the second network to the first network; and
electronically obtaining the document at a computer of the first network.

16. The method according to claim 15 wherein the one-way communication channel is a simplex communication channel.

17. The method according to claim 15 wherein the signal representing the request for a document comprises a URL.

18. The method according to claim 15 wherein the document is a webpage.

19. The system according to claim 11, further comprising a one-way communication channel from the second network to the first network, the channel operable to convey from the second network to the first network a signal representing a request for a document.

* * * * *